(12) United States Patent
Bastuck et al.

(10) Patent No.: US 12,163,592 B2
(45) Date of Patent: Dec. 10, 2024

(54) OIL CONTROL RING

(71) Applicant: Federal-Mogul Burscheid GmbH, Burscheid (DE)

(72) Inventors: Thomas Bastuck, Duesseldorf (DE); Markus Kellner, Leverkusen (DE); Eugen Haaf, Leverkusen (DE); Dirk Baerenreuter, Odenthal (DE)

(73) Assignee: FEDERAL-MOGUL BURSCHEID GMBH, Burscheid (DE)

( * ) Notice: Subject to any disclaimer, the term of this patent is extended or adjusted under 35 U.S.C. 154(b) by 140 days.

(21) Appl. No.: 17/771,759

(22) PCT Filed: Nov. 3, 2020

(86) PCT No.: PCT/DE2020/100934
§ 371 (c)(1),
(2) Date: Apr. 25, 2022

(87) PCT Pub. No.: WO2021/143961
PCT Pub. Date: Jul. 22, 2021

(65) Prior Publication Data
US 2022/0412459 A1 Dec. 29, 2022

(30) Foreign Application Priority Data
Jan. 15, 2020 (DE) .................... 10 2020 100 764.7

(51) Int. Cl.
*F16J 9/20* (2006.01)
*F16J 9/06* (2006.01)

(52) U.S. Cl.
CPC ............... *F16J 9/20* (2013.01); *F16J 9/068* (2013.01)

(58) Field of Classification Search
CPC ........ F16J 9/00; F16J 9/20; F16J 9/062; F16J 9/068
See application file for complete search history.

(56) References Cited

U.S. PATENT DOCUMENTS

| | | | | |
|---|---|---|---|---|
| 2,469,959 A | | 5/1949 | Frazier | |
| 2,795,469 A | * | 6/1957 | Haling | F16J 9/145 277/479 |
| 3,004,811 A | * | 10/1961 | Mayfield | F16J 9/067 267/1.5 |
| 3,356,375 A | * | 12/1967 | Harris | F16J 9/066 277/435 |

(Continued)

FOREIGN PATENT DOCUMENTS

| | | |
|---|---|---|
| DE | 692 16 056 T2 | 6/1997 |
| DE | 10 2017 128 578 A1 | 6/2019 |

(Continued)

*Primary Examiner* — Eugene G Byrd
*Assistant Examiner* — L. Susmitha Koneru
(74) *Attorney, Agent, or Firm* — Norris McLaughlin, P.A.

(57) ABSTRACT

A multi-piece oil scraper piston ring includes a slotted spring element and at least one lamella element which is operatively connected to the slotted spring element and provided with a joint, the spring element being designed as a meander spring that axially receives and radially supports the lamella element, the two end regions of the meander spring being provided with legs that extend approximately parallel to one another and the axial length of which is designed such that the legs at least partially engage in the joint of the lamella element.

2 Claims, 1 Drawing Sheet

(56) References Cited

U.S. PATENT DOCUMENTS 5,195,758 A    3/1993  Erway
2014/0251254 A1*  9/2014  Franz .................... F16J 9/068
                                                      123/193.6

FOREIGN PATENT DOCUMENTS

| EP | 3 492 782 A1 | 6/2019 |
| FR | 1.280.297 | 11/1961 |
| JP | S54-130719 A | 10/1979 |
| WO | 2013/004217 A2 | 1/2013 |

* cited by examiner

OIL CONTROL RING

The invention relates to a multi-piece oil scraper piston ring, comprising a slotted spring element and at least one lamella element, which is operatively connected thereto and provided with a joint.

The task of multi-piece oil scraper piston rings is to prevent the oil from the crankcase from entering the combustion chamber.

As a result of more stringent exhaust gas regulations, increased importance is attached, in particular, to the topic of "particulate emissions." It is assumed that oil entering the combustion chamber plays a significant role in particulate emissions due to unclean combustion. It was possible to prove through experimentation that, during coasting operations, oil is drawn to a greater degree from the crankcase in the direction of the combustion chamber as a result of negative pressure in the combustion chamber.

WO 2013/004217 A1 discloses an oil scraper ring for a piston of an internal combustion engine, comprising at least one lamella having a respective joint and a meander-shaped spacer spring having a joint, wherein the at least one lamella and the spacer spring are in contact with one another. The joint of the at least one lamella includes an acute angle with the radius of the at least one lamella. This oil scraper ring preferably comprises two lamellae that extend parallel to one another, between which the spacer spring is disposed, wherein each lamella has a joint.

A piston ring, in particular an oil scraper ring, became known from U.S. Pat. No. 2,469,959, comprising two lamellae, the joints of which are provided so as to overlap, and an interposed spacer spring.

The subject matter of the invention is directed to providing an oil scraper piston ring in which oil from the crankcase is substantially prevented from reaching the combustion chamber, whereby particulate emissions can be reduced.

This object is achieved by a multi-piece oil scraper piston ring, comprising a slotted spring element and at least one lamella element, which is operatively connected thereto and provided with a joint, the spring element being designed as a meander spring that, on the one hand, axially receives and, on the other hand, radially supports the lamella element, the two end regions of the meander spring being provided with legs that extend approximately parallel to one another and the axial length of which is designed such that the legs at least partially engage in the joint of the lamella element.

Advantageous refinements of the subject matter of the invention are disclosed in the dependent claims.

The axial length of the legs of the meander spring is such that the ends of the legs end approximately at the height of the upper flank of the lamella element.

According to a further idea of the invention, the meander spring cooperates with an upper lamella element, facing a combustion chamber, and a lower lamella element, facing an oil chamber, wherein the legs of the meander spring engage in the joint of the upper lamella element.

The legs of the meander spring are advantageously guided with defined clearance within the joint of the lamella element.

According to a further idea of the invention, the thickness of the two legs of the meander spring is designed to be less than the joint width of the lamella element, so that the legs bearing on one another are guided with defined clearance (as viewed in the circumferential direction) within the joint of the lamella element, with the tangential force of the lamella element being maintained.

According to the new design according to the invention of the oil scraper ring, the ends of the meander spring are designed to be longer in the axial direction, so that these engage with defined clearance in the space that is present between the joint ends of a lamella element, preferably the lamella element facing the combustion chamber. In this way, the open joint of the lamella element is blocked from serving as a potential passage for oil. As a result, less oil from the crankcase finds its way toward the combustion chamber, so that particulate emissions can also be reduced.

The subject matter of the invention is shown in the drawing based on an exemplary embodiment and is described as follows. In the drawings.

Figure 1:
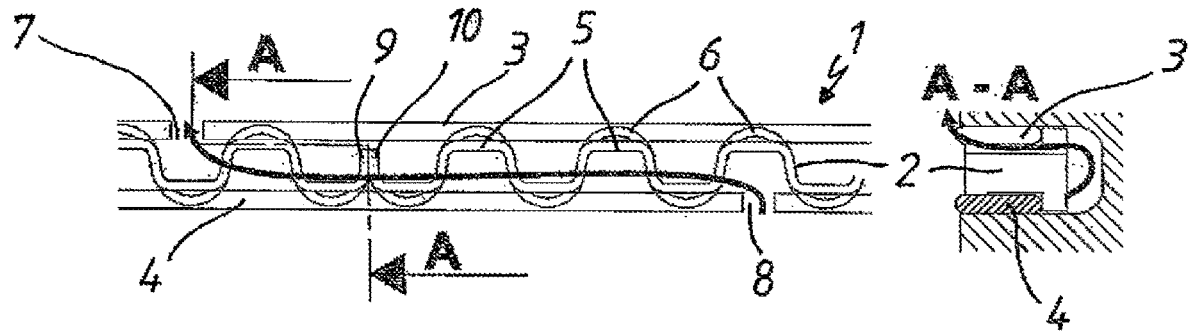
FIG. 1 shows an oil scraper piston ring according to the prior art in various views or sections.

FIG. 1 shows an oil scraper piston ring 1 according to the prior art in various views or sections. The oil scraper piston ring 1 comprises a meander spring 2 and two lamella elements 3, 4. The meander spring 2 is designed such that, on the one hand, axial receiving regions 5 for the respective lamella element 3, 4 and, on the other hand, radial supporting regions 6 for the respective lamella element 3, 4 are formed. Each lamella element 3, 4 is provided with a joint 7, 8. The meander spring 2 is slotted and, at the joint side, comprises two legs 9, 10 that extend approximately parallel to one another and are provided at a defined distance with respect to the upper lamella element 3.

Figure 2:
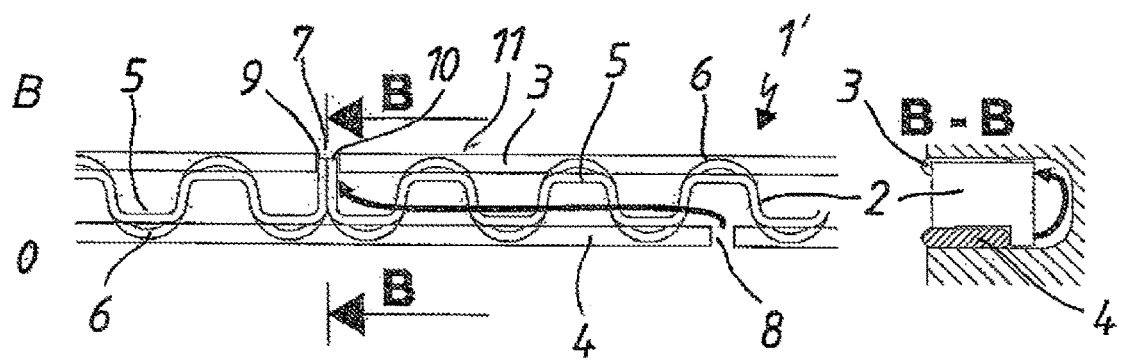
FIG. 2 shows a schematic diagram of an oil scraper piston ring according to the invention in various views or sections.

FIG. 2 shows the oil scraper piston ring 1' according to the invention. Identical components are denoted by identical reference numerals. The meander spring 2 and the lamella elements 3, 4 are apparent. According to the invention, the legs 9, 10 are designed to be so long that these protrude, at least partially, with defined clearance into the joint 7 of the upper lamella element 3. The maximum length of the legs 9, 10 can be designed such that the ends thereof are situated approximately at the height of the flank 11 of the upper lamella element 3.

The lamella element 3 will face a combustion chamber B, which is not shown, and the lamella element 4 will face an oil chamber O, which is likewise not shown.

While, in the illustration according to FIG. 1, oil is able to flow via the joint 8, the meander spring 2, and the joint 7 of the lamella element 3, in the direction of the combustion chamber B, according to FIG. 2, a sealing closure is formed by the legs 9, 10 of the meander spring 2, which engage in the joint 7, the closure substantially blocking oil from flowing through axially (see arrows in FIGS. 1 and 2).

Figure 3:
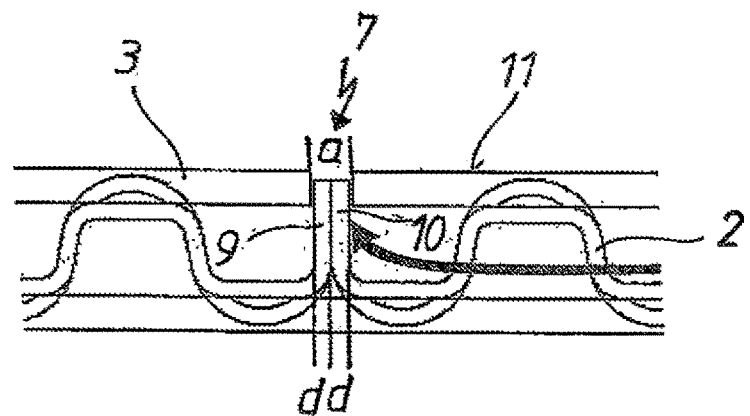
FIG. 3 shows an enlarged illustration of the joint region of the lamella ring to be sealed according to FIG. 2.

FIG. 3 shows an enlarged illustration of the sealed region of the upper lamella element 3 according to FIG. 2. The two legs 9, 10 of the meander spring 2 are apparent. The joint 7 of the lamella element 3 has a predefinable joint width a. The legs 9, 10 have the same thickness d and bear against one another in a planar manner. In this example, the axial end of the legs 9, 10 is to be provided beneath the flank 11 of the upper lamella element 3. So as to avoid jamming of the legs 9, 10 within the joint 7, on the one hand, and so as not to impair the tangential force of the lamella element 3, on the other hand, the two legs 9, 10 of the lamella element are positioned with defined clearance (as viewed in the circumferential direction) within the joint width a of the joint 7. A clearance fit that is customary for shafts may be assumed here. Since piston rings are designed with different diameters for different applications, the particular clearance fits are to be adapted accordingly.

LIST OF REFERENCE SIGNS 1 oil scraper piston ring
1' oil scraper piston ring
2 meander spring
3 lamella element
4 lamella element
5 receiving region
6 supporting region
7 joint (lamella element)
8 joint (lamella element)
9 leg (meander spring)
10 leg (meander spring)
11 flank of upper lamella element
a joint width
d thickness of leg

The invention claimed is:

1. A multi-piece oil scraper piston ring, comprising a slotted spring element and at least one lamella element, each of the at least one lamella element being operatively connected to the slotted spring element and provided with a respective joint, the slotted spring element being formed as a meander spring that axially receives and radially supports each of the at least one lamella element, each of opposite two end regions of the meander spring being provided with a respective leg, axial length of each of the legs being such that the legs at least partially are received in the joint of one of the at least one lamella element, wherein the legs received in the joint extend approximately parallel to one another and bear on one another and combined thickness of the legs is less than width of the joint in which the legs are at least partially received so that tangential force of the lamella element in the joint of which the legs are at least partially received is maintained and whereby the legs are configured to seal the joint against passage of oil therethrough, and further wherein the at least one lamella element comprises an upper lamella element and a lower lamella element, the upper and lower lamella elements are configured to face a combustion chamber and an oil chamber, respectively, and the joint in which the legs are at least partially received is only in the upper lamella.

2. The oil scraper piston ring according to claim 1, wherein the axial length of the legs at least partially received in the joint is such that the ends of the legs are approximately at a height of an upper flank of the lamella element in the joint of which the legs are at least partially received.

* * * * *